US005156691A

United States Patent [19]

Hollenberg et al.

[11] Patent Number: 5,156,691

[45] Date of Patent: Oct. 20, 1992

[54] PROCESS FOR IMPROVING THE COLD FORMABILITY OF HEAT-TREATABLE STEELS

[75] Inventors: Lutz Hollenberg, Wesel; Cestmir Lang, Oberhausen; Wolfgang Müschenborn, Dinslaken, all of Fed. Rep. of Germany

[73] Assignee: Thyssen Stahl AG, Duisburg, Fed. Rep. of Germany

[21] Appl. No.: 583,901

[22] Filed: Sep. 17, 1990

[30] Foreign Application Priority Data

Oct. 12, 1989 [DE] Fed. Rep. of Germany ....... 3934037

[51] Int. Cl.[5] ........ C21D 9/00

[52] U.S. Cl. ........ 148/663

[58] Field of Search ........ 148/12 R, 134, 12.4, 148/12 F, 320

[56] References Cited

U.S. PATENT DOCUMENTS 3,285,789 11/1966 Grange et al. ........ 148/12 R 4,581,079 4/1986 Borik ........ 148/12 R

*Primary Examiner*—Deborah Yee

*Attorney, Agent, or Firm*—Sprung Horn Kramer & Woods

[57] ABSTRACT

The invention relates to a process for improving the cold formability of hot rolled or cold rolled heat-treatable steels.

The characterizing feature of the invention is that with a composition of (in % by weight)

0.32–0.54% C
0.05–0.40% Mn
0.41–1.5% Si
0.02–0.15% Al
maximum 0.05% Cr
maximum 0.05% S
maximum 0.03% P
maximum 0.02% N
residue iron and unavoidable impurities prior to the final cold forming and quench hardening with subsequent tempering is performed for at least 15 hours at temperatures between 620° and 680° C. to graphitization, while with a composition of 0.55–1.3% C
0.20–0.30% Mn
0.41–0.90% Si
0.02–0.15% Al
maximum 0.05% Cr
maximum 0.010% S
maximum 0.03% P
maximum 0.02% N
residue iron and unavoidable impurities said annealing lasts for at least 8 hours.

2 Claims, No Drawings

PROCESS FOR IMPROVING THE COLD FORMABILITY OF HEAT-TREATABLE STEELS

The invention relates to a process for improving the cold formability of heat-treatable steels having a composition as specified in claims 1 and 2.

Unless otherwise stated, all chemical compositions are given percentages by weight.

Heat-treatable steels having the stated carbon contents of 0.3 to 0.54 or 0.55 to 1.3% and also manganese contents of approximately 0.5 to 0.9%, maximum silicon contents of 0.4% and maximum sulphur and phoshorus contents of 0.045% are further processed on a large scale in the form of sheet metal, strip, wire or profiles both in the hot rolled state and also after subsequent cold rolling or cold drawing, by cold forming, such as bending, folding, levelling, coiling, punching, deep drawing and cold extrusion. Normally a heat treatment is carried out on the produced finished parts made from these steels, by hardening and tempering to reach the required strength and hardness values.

Due to the high carbon contents, the initial products manufactured by the hot rolling of these steels have a pearlitic-ferritic structure (with less than 0.8% C) or a pearlitic micro structure (with more than 0.8% C), the pearlite being in a lamellar shape.

Those hot rolled products are characterized by high values of tensile strength and low values of total elongation. In the past attempts have been made to improve tensile and ductility properties, which are unfavourable for cold formability, by soft annealing in the temperature range of about 690° to 720° C. The term "cold formability" characterizes the capability of the material to experience a permanent change in shape without previous heating as, for example, in bending, deep drawing, stretch forming or cold extrusion. In general, low strength values and high total elongation values result in improved cold formability.

In soft annealing for a number of hours, the lamellar pearlitic cementite is converted into a spherical form, something which results in a reduction in tensile strength and an increase in total elongation.

The spheroidization of pearlitic cementite is regarded as a necessary precondition for improving the properties for the subsequent cold forming operation. For the improvement of cold formability it is also important for the spheroidized cementite to be present in as coarse a form as possible; the coarser the cementite particles, the better the cold formability.

To improve cold formability, it has also been recommended to heat hot rolled and cold rolled initial products slowly and then cool them slowly in the two phase region (austenite+pearlite) at temperatures between 730° and 760° C. (Metal Progress 64, 1953, No. 7, pages 79–82). In that soft annealing process, finely spheroidized cementite produces a precipitation hardening resulting in a deterioration in cold formability.

German Patent Specification 37 21 641 discloses a process for the production of hot-rolled strip from unalloyed or low-alloyed steels having 0.3 to 0.9% C, wherein a coarse lamellar pearlite of reduced strength is obtained by shifting the austenite-pearlite transformation from the run-out table of the hot strip mill to the wound coil. In spite of a reduction in tensile strength to values between 500 and 780 N/mm$^2$, cold formability is only slightly influenced by this process.

It is an object of the invention so to enhance the cold formability of heat-treatable steels having carbon contents in the range of 0.3 to 0.54% and 0.55 to 1.3% that even severely cold-form parts can be produced from the initial products of these steels.

This problem is solved according to the invention by the features of claim 1.

German Patent Specification 37 21 641 discloses heat-treatable steels which can have the composition of the steels used for the process according to the invention.

The steels suitable for the process according to the invention can also contain one or more of the elements mentioned in claim 2 up to each maximum value stated therein.

After graphitization annealing and cold forming the steel is austenitized with a minimum holding time of 10 minutes at a temperature of 850° C. or higher, followed by quenching and tempering.

The process according to the invention makes use of the fact that pearlitic-ferritic and pearlitic steels of the composition stated in the claims enable the lamellar pearlitic cementite to be transformed into graphite. The advantage of such transformation is that the graphite particles are clearly larger than the cementite particles, so that no precipitation hardening can take place. This results in a considerable reduction in strength and an improvement in cold formability to the level of known mild cold-rolled steels with about 0.06% C.

A double effect is ascribed to the manganese content as regards graphite formation. On the one hand, the manganese content reduces the Acl temperature and stabilizes the cementite, so that the manganese content must be limited to a maximum of 0.4%. Higher manganese contents lead to a suppression of graphite formation. On the other hand, in view of the MnS formation, a minimum content of 0.05% in the steel is of great importance, since the manganese sulphides act as nuclei for the graphite formation. A minimum Mn:S ratio higher than 10 must be present for the complete formation of MnS in the steel.

The aluminium content of the steel plays a considerable part in the nucleation of the graphite. Not only the aforementioned MnS, but also $Al_2O_3$ and also AlN can be used as possible sites for graphite nucleation. The $Al_2O_3$ particles are formed as early as the solidification of the steel and remain substantially uninfluenced by the thermomechanical treatment of the steel. AlN-particles can form even before graphite during cooling from the rolling temperature or during an annealing in the range of 620° to 680° C., and thereby act as nuclei of the graphite particles to encourage a cementite-graphite transformation. For reasons of a complete oxygen and nitrogen fixation, the lower aluminium content is 0.02%, while the upper limit according to the invention is 0.15%. With higher aluminium contents, as a whole a smaller number of distinctly coarser aluminum oxides and aluminium nitrides is formed. Since these particles act as nuclei for graphite precipitation, the paths of diffusion of carbon to nuclei become longer, so that graphite formation is delayed. The upper limit of the aluminum content is therefore 0.15%.

In graphitization the most important part is played by silicon, in addition to manganese and aluminium. The strong graphitizing effect of silicon is due both to the rise in the Acl temperature and also the reduction in the stability of the cementite. The rise in the Acl temperature accelerates carbon diffusion to the graphite nuclei, and the reduced stability of the cementite ensures that the transformation to graphite occurs rapidly. The lower silicon content is 0.15%; the use of higher silicon contents is opposed by solid solution hardening via dissolved silicon atoms. Experience shows that the result is an increase in yield point of about 60N/mm$^2$ per 1% of Si. The upper silicon content is therefore fixed at 1.5%.

For the annealing conditions according to the invention the rate of graphitization also depends on the carbon content of the steel. With contents of between 0.32 and 0.54% C the transformation to graphite takes place more slowly than with higher carbon contents. This is due to the fact that with a low carbon content fewer cementite particles are present, and as a result the paths of diffusion of the carbon atoms to the graphite nuclei are too long. The annealing at 620° to 680° C. for graphitization is therefore at least 15 hours according to the invention (claim 1), while for carbon contents of 0.55 to 1.3% the annealing time at 620° to 680° C. is according to the invention at least 8 hours (claim 2).

According to claim 1 there is a top limit to the silicon content of steels having carbon contents of 0.55 to 1.3% by weight, since this keeps solid solution hardening within limits, meaning an increase in strength. In addition, the upper limiting of the manganese content enables graphite to form more quickly. Lastly, with carbon contents above 0.55%, for the same steel composition graphite forms more quickly than in the case of steels having carbon contents below 0.55%.

A steel composition as specified in claim 1 and having the additional alloying contents given in claim 2 results in particularly favourable properties as regards cold formability and behaviour during tempering following hardening.

As a strong carbide former, chromium is enriched in and stabilizes the cementite, thereby considerably reducing the driving force of graphitization. For this reason the chromium contents of the steel are kept as low as possible, namely to values below 0.05%, which count as impurities.

Just like manganese, nickel reduces the Acl temperature, its effect on the reduction of carbon activity being clearly lower than in the case of manganese. In spite of this fact, nickel encourages graphitization. The effect of nickel is mainly due to an increase in nucleation velocity of graphite formation.

In addition to nickel, molybdenum is indirectly a graphite-encouraging element whose effect is based on a suppression of the pearlite transformation. During the cooling of molybdenum-containing steels following rolling there is an increased formation of bainite or martensite. Graphitization of bainitic-martensitic structure takes place more quickly than in the case of a pearlitic micro structure.

In addition to the alloying elements nickel and molybdenum, boron and vanadium increase hardenability, while titanium and zirconium are used for nitrogen fixation or to influence the sulphide shape.

As already mentioned, in addition to the stated steel composition, certain temperature/time cycles must be observed for the graphitization of steel. It has been surprisingly found that the maximum speed of transformation to graphite is in the temperature range between 620° and 680° C. In the case of both hot rolled and cold rolled products, the minimum time for a graphitization in the temperature range of 620° to 680° C. is 15 hours for steels having carbon contents between 0.32 and 0.54%, while it is 8 hours for steels with contents of 0.55 to 1.3% C. The guide values for the graphite area fraction are 1.0 to 1.5% for steels with carbon contents of about 0.45%, and between 2.0 and 2.5% for steels having 0.75% C. These values are obtained if a quantitative measurement is performed by means of an automatic image analyzer.

In contrast with hot rolled and cold rolled mild steels of comparable cold formability, the graphitized high carbon steels of the stated composition can be heat-treated i.e., they can be hardened and tempered after cold forming. It was found that at the slightly raised austenitization temperature of 850° C. and higher, and also with a holding time of at least 10 minutes at that temperature, the graphite is dissolved, therefore making possible the good hardenability of the steel.

The subsequent heat treatment of the steel is therefore performed with an austenitization temperature greater than or equal to 850° C. and a minimum holding time of 10 minutes. Graphitizable steels may tend towards graphite re-formation if they are tempered to higher temperatures following hardening. In this respect, steels with a low silicon content of about 0.45% are more susceptible than steels having silicon contents above 0.7%. The low-silicon-containing steels can be tempered only up to 550° C. without the risk of graphite re-formation, with resulting loss of strength and toughness. This limit is raised to 600° C. in the case of steels having silicon contents above 0.7%.

The invention will now be explained in greater detail with reference to examples. Table 1 gives a survey of the steel compositions. Hot rolled and cold rolled products such as strip, wire and sectional steel were produced on an experimental scale from the steels listed under A to Q and annealed as stated in Table 2. In the case of a number of experimental steels, hardenability was checked under different austenitization conditions (Table 3).

The steels C, D, F, G, H, J, M, O and Q are covered by the invention. Due to excessive chromium and magnesium content and deficient aluminium contents, the steels A and B are not covered by the invention. Similarly, the invention does not cover the steels E, L, N, P (excessive manganese content, partially deficient aluminium content) or the steels I and K (excessive Si content).

The values given in Table 2 show that the steels covered by the invention have substantially lower yield points and values of tensile strength and also higher values of total elongation than steels produced by the previous process-i.e., with spheroidized cementite and without graphite.

The last column of Table 2 shows guide values for the graphite area proportion. The invention does not cover the steels I and K, although these two steels have high graphite area proportions following annealing. This is connected with the fact that the Si contents of both steels are high (1.72 and 1.65% respectively). The solid solution hardening due to silicon reduces strength and total elongation values, so that these steels have only slight advantages in comparison with conventional steels having spheroidized cementite.

Neither does the invention cover the steels D (cold rolled strip) or Q (wire rod). In the case of these products the annealing time in the temperature range of 620° to 680° C. was selected too short at 5 and 4 hours respectively. Due to a graphite-susceptible steel composition, partial graphitization took place; however, the annealing time was too short to ensure substantial graphitization of the steels. For this reason only limited improvements in cold formability was achieved.

The steels J and M, whose hardenability was checked, were subjected to an austenitization treatment in the temperature range between 800° and 900° C. with holding times of 3 to 20 minutes. The comparison (Table 3) shows that maximum quenching hardnesses of about 795HV 30, which is a measure of good hardenability, were obtained only with a minimum austenitization temperature of 850° C. and a minimum holding time of 10 minutes. The samples austenitized at lower temperatures and with shorter holding times had low quenching hardness values due to incompleted dissolution of the graphite particles and therefore showed unsatisfactory hardenability.

TABLE 1

| | | | | Chemical Composition | | | | | | | | | | | | | | |
|---|---|---|---|---|---|---|---|---|---|---|---|---|---|---|---|---|---|---|
| Invention | Ref. | C-Content (guide value) % | Product* | C | Mn | Si | P | S | N | Al | Cr | Ni | Mo | V | Ti | Zr | Cu | B |
| | A | 0.35 | WB, KB | 0.38 | 0.86 | 0.16 | 0.012 | 0.012 | 0.0065 | 0.008 | 0.19 | — | — | — | — | — | — | — |
| | B | 0.35 | WD | 0.35 | 0.62 | 0.25 | 0.010 | 0.007 | 0.0048 | 0.006 | 0.070 | — | — | — | — | — | — | — |
| * | C | 0.35 | WB, KB | 0.36 | 0.28 | 0.45 | 0.018 | 0.008 | 0.0042 | 0.035 | 0.010 | — | — | — | 0.015 | — | 0.015 | 0.003 |
| * | D | 0.45 | WB, KB | 0.44 | 0.22 | 0.69 | 0.016 | 0.009 | 0.0036 | 0.042 | 0.015 | — | — | 0.04 | — | — | — | — |
| | E | 0.45 | WB, KB | 0.46 | 0.71 | 0.25 | 0.007 | 0.010 | 0.0028 | 0.035 | 0.04 | — | — | — | — | — | — | — |
| * | F | 0.45 | WD, F | 0.47 | 0.18 | 0.71 | 0.012 | 0.014 | 0.0062 | 0.036 | 0.010 | — | 0.15 | — | — | — | — | — |
| * | G | 0.60 | WB, KB | 0.58 | 0.29 | 0.65 | 0.010 | 0.007 | 0.0028 | 0.035 | 0.015 | — | — | — | — | — | — | — |
| * | H | 0.60 | F | 0.60 | 0.22 | 0.56 | 0.014 | 0.004 | 0.0050 | 0.065 | 0.020 | 0.35 | — | — | — | 0.04 | 0.020 | — |
| | I | 0.60 | WB, KB | 0.59 | 0.24 | 1.72 | 0.018 | 0.008 | 0.0061 | 0.020 | 0.015 | — | — | — | — | — | — | — |
| * | J | 0.75 | WD | 0.75 | 0.16 | 0.43 | 0.009 | 0.003 | 0.0060 | 0.082 | 0.012 | — | — | — | 0.020 | — | — | — |
| | K | 0.75 | KB | 0.75 | 0.23 | 1.65 | 0.012 | 0.009 | 0.0049 | 0.045 | 0.008 | — | — | — | — | — | — | — |
| | L | 0.75 | WD | 0.76 | 0.57 | 0.22 | 0.016 | 0.012 | 0.0052 | 0.015 | 0.030 | — | — | — | — | — | — | — |
| * | M | 0.75 | WB, KB | 0.73 | 0.21 | 0.42 | 0.014 | 0.010 | 0.0042 | 0.048 | 0.017 | — | — | — | — | — | — | — |
| | N | 0.75 | F | 0.76 | 0.63 | 0.25 | 0.017 | 0.010 | 0.0035 | 0.006 | 0.020 | — | — | — | — | — | — | — |
| * | O | 0.85 | WB, KB | 0.85 | 0.22 | 0.72 | 0.019 | 0.006 | 0.0072 | 0.035 | 0.012 | — | — | — | — | — | — | — |
| | P | 0.85 | WB | 0.84 | 0.49 | 0.28 | 0.012 | 0.014 | 0.0046 | 0.004 | 0.015 | — | — | — | — | — | — | — |
| * | Q | 0.85 | WD | 0.86 | 0.30 | 0.68 | 0.010 | 0.015 | 0.0038 | 0.078 | 0.023 | — | — | — | — | — | — | — |

Explanations:
*WB = hot rolled strip
KB = cold rolled strip
WD = wire rod, cold-drawn wire
F = steel shapes

TABLE 2

MECHANICAL PROPERTIES OF THE STEELS IN TABLE 1 AFTER A GRAPHITIZATION ANNEALING

| Inv. | Steel | C content (guide val.) % | Prod. | Holding time at 620–680° C. (h) | ReL N/mm² | $R_m$ N/mm² | A5 % | Graphite area fraction |
|---|---|---|---|---|---|---|---|---|
| | A | 0.35 | WB | 25 | 323 | 480 | 29.5 | — |
| | A | 0.35 | KB | 20 | 290 | 451 | 30.2 | — |
| | B | 0.35 | WD | 20 | 311 | 465 | 31.4 | — |
| * | C | 0.35 | WB | 25 | 235 | 404 | 34.2 | 0.7 |
| * | C | 0.35 | KB | 25 | 225 | 386 | 35.6 | 0.8 |
| * | D | 0.45 | WB | 22 | 242 | 379 | 31.2 | 1.2 |
| * | D | 0.45 | KB | 16 | 221 | 373 | 35.2 | 1.4 |
| | D | 0.45 | KB | 5 | 320 | 464 | 26.8 | 0.3 |
| | E | 0.45 | KB | 16 | 350 | 483 | 25.2 | — |
| * | F | 0.45 | WD | 30 | 246 | 382 | 36.2 | 1.2 |
| * | F | 0.45 | F | 24 | 248 | 393 | 34.3 | 1.1 |
| * | G | 0.60 | WB | 25 | 235 | 368 | 32.6 | 1.7 |
| * | G | 0.60 | KB | 25 | 228 | 370 | 33.0 | 1.8 |
| * | H | 0.60 | F | 18 | 243 | 362 | 32.2 | 1.6 |
| | I | 0.60 | WB | 15 | 282 | 495 | 26.3 | 2.0 |
| | I | 0.60 | KB | 15 | 294 | 507 | 28.2 | 2.0 |
| * | J | 0.75 | WD | 20 | 180 | 352 | 36.6 | 2.1 |
| | K | 0.75 | KB | 15 | 265 | 435 | 28.4 | 2.3 |
| | L | 0.75 | WD | 16 | 440 | 556 | 26.8 | — |
| * | M | 0.75 | KB | 3 | 325 | 478 | 25.6 | 0.8 |
| * | M | 0.75 | WB | 20 | 184 | 351 | 36.6 | 2.2 |
| * | M | 0.75 | KB | 10 | 178 | 359 | 32.4 | 2.4 |
| | N | 0.75 | F | 20 | 457 | 619 | 24.8 | — |
| * | O | 0.85 | KB | 20 | 192 | 365 | 34.2 | 2.8 |
| * | O | 0.85 | WB | 16 | 203 | 358 | 33.6 | 2.9 |
| | P | 0.85 | WB | 16 | 475 | 641 | 22.3 | — |
| * | Q | 0.85 | WD | 18 | 205 | 368 | 35.2 | 2.7 |
| | Q | 0.85 | WD | 4 | 382 | 545 | 24.6 | 0.6 |

Explanations:
WB = hot rolled strip
KB = cold rolled strip
WD = wire rod, cold-drawn wire
F = steel shapes

TABLE 3

| INFLUENCE OF AUSTENITIZATION CONDITIONS ON THE QUENCH HARDNESS OF GRAPHITIZABLE STEELS | | | | |
|---|---|---|---|---|
| Steel | Graphite area fraction % | Temperature °C. | Holding time min | Quench hardness HV 30 |
| I | 2.1 | 800 | 20 | 410 |
| I | 2.1 | 850 | 3 | 685 |
| I* | 2.1 | 850 | 10 | 795 |
| I* | 2.1 | 900 | 10 | 790 |
| M | 2.4 | 800 | 20 | 400 |
| M | 2.4 | 850 | 3 | 670 |
| M* | 2.4 | 850 | 10 | 795 |
| M* | 2.4 | 900 | 10 | 795 |

*According to the invention

We claim:

1. A process for improving the cold formability of hot rolled or cold rolled heat-treatable steels, wherein when the steel has a composition of (in % by weight)

0.32–0.54% C
0.95–0.40% Mn
0.41–1.5% Si
0.02–0.15% Al
maximum 0.05% Cr
maximum 0.05% S
maximum 0.03% P
maximum 0.02% N
residue iron and unavoidable impurities prior to the final cold forming, quench hardening with subsequent tempering is performed with said tempering lasting for at least 15 hours at temperatures between 620° and 680° C. to effect graphitization, while when the steel has a composition of 0.55–1.3% C
0.20–0.30% Mn
0.41–0.90% Si
0.02–0.15% Al
maximum 0.05% Cr
maximum 0.010% S
maximum 0.03% P
maximum 0.02% N
residue iron and unavoidable impurities said quench hardening with subsequent tempering is performed with said tempering lasting for at least 8 hours.

2. A process according to claim 1, wherein the steel also contains at least one of the following elements (in % by weight):

up to 1% Ni
up to 0.5% Mo
up to 0.10% V
up to 0.04% Ti
up to 0.15% Zr
up to 0.01% B.

* * * * *